April 24, 1951  M. A. CROSBY  2,550,405
INTENSIFIER

Filed May 9, 1947  2 Sheets-Sheet 1

INVENTOR
MELVIN ALLEN CROSBY
BY
, ATTORNEYS

April 24, 1951  M. A. CROSBY  2,550,405
INTENSIFIER
Filed May 9, 1947  2 Sheets-Sheet 2
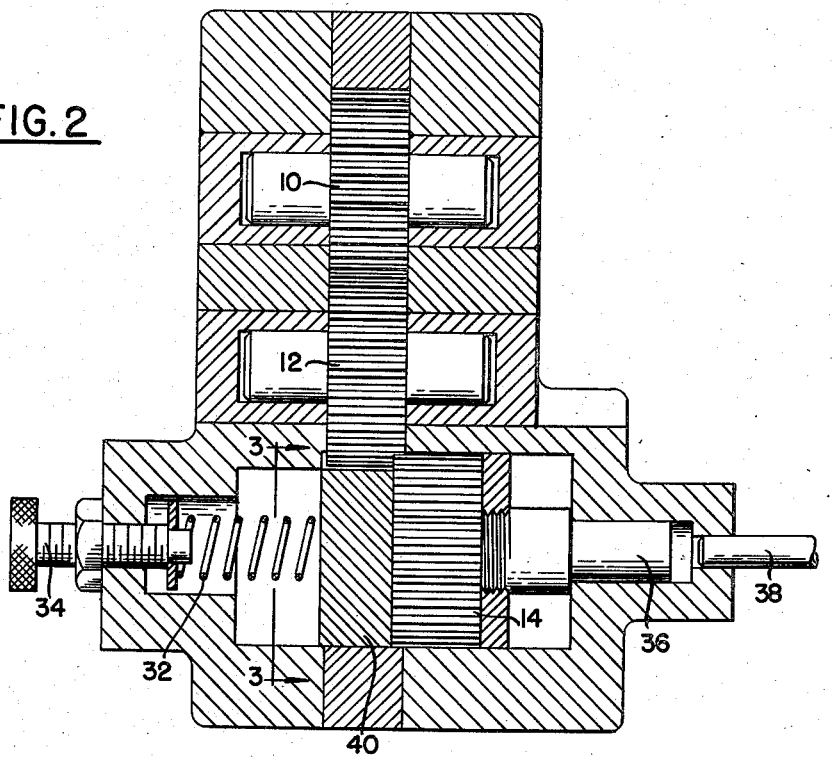
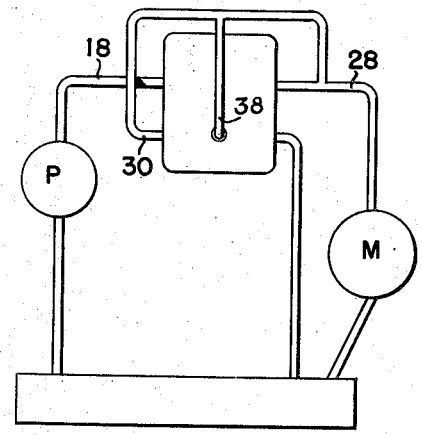
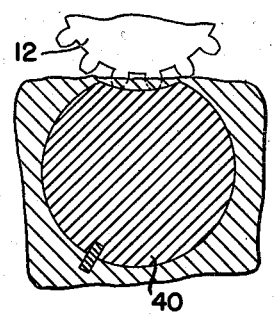
INVENTOR
MELVIN ALLEN CROSBY
BY
Toulmin & Toulmin
ATTORNEYS Patented Apr. 24, 1951

2,550,405

UNITED STATES PATENT OFFICE 2,550,405

INTENSIFIER

Melvin Allen Crosby, Springfield, Ohio, assignor to H-P-M Development Corporation, Wilmington, Del., a corporation of Delaware Application May 9, 1947, Serial No. 746,986

6 Claims. (Cl. 103—11)

This invention relates to a fluid operable apparatus, and particularly to a fluid operable pressure convertor or intensifier.

The particular object of this invention is to provide a pressure convertor in which the shifting over from one pressure to another is accomplished smoothly and without sudden changes of pressure.

A still further object is the provision of a pressure convertor which is continuous in operation, unlimited in capacity, and which may be shifted from one pressure range to another without the use of auxiliary valves.

It is also an object of this invention to provide a pressure convertor which is inexpensive to construct and which has for its principal parts standard articles of manufacture, there resulting in an inexpensive product.

These and other objects and advantages will become more apparent upon reference to the following description taken in connection with the accompanying drawings in which:

Figure 2 is a transverse section indicated by the line 2—2 on Figure 1;

Figure 3 is a fragmentary section indicated by the line 3—3 on Figure 2;

Figure 5 is a diagrammatic view illustrating the use of this invention as a volume booster.

Figure 1:
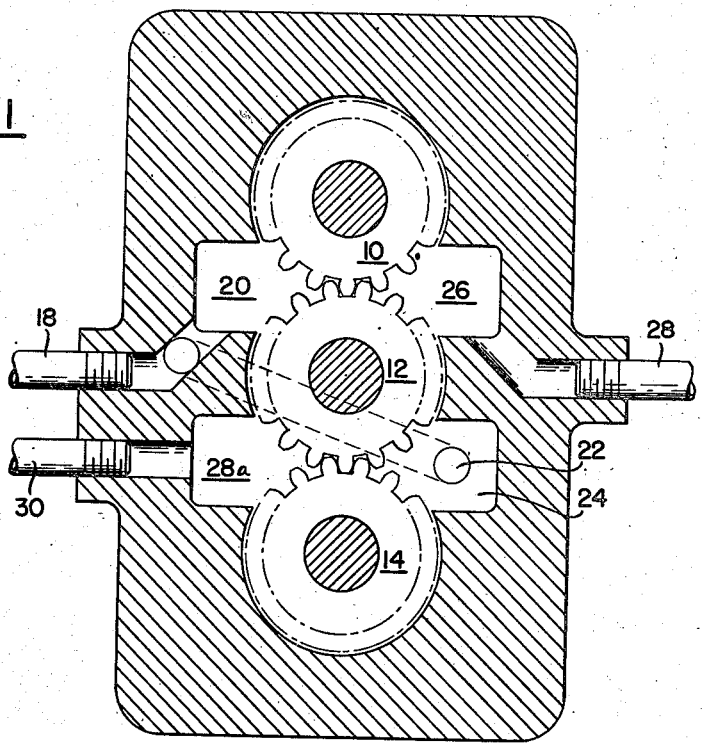
Figure 1 is a vertical section through a convertor according to this invention.

Referring to the drawings the convertor according to this invention comprises a multiple gear pump one of which is axially movable to vary its degree of engagement with one of the other gears.

A unit of this nature is characterized by being infinitely variable between its limits of operation. As will become more evident hereinafter this variability results in a smoothly changing pressure curve from low pressure operation to high pressure operation and thus eliminates pressure shock in the supplied circuit and the danger that any of the hydraulic equipment will be overloaded and damaged.

In Figure 1 the three gears are indicated at 10, 12 and 14 and they are mounted within a pump housing 16. An inlet conduit 18 communicates with the left hand side of the gears 10 and 12 as at 20 and, through a cored passage 22, with the right hand side of the gears 12 and 14 as at 24.

The right hand side of the gears 10 and 12 is connected as at 26 with a discharge conduit 28 while the left hand side of the gears 12 and 14 is connected as at 28a with an exhaust conduit 30.

The gear 14, as best seen in Figure 2 is continually urged toward a position of minimum engagement with the gear 12 by a compression spring 32. The thrust on this spring is preferably adjustable by the screw 34. The gear 14 is movable in the opposite direction into a position of greater engagement with the gear 12 by a pilot plunger 36 which receives pressure fluid from the pilot line 38.

Adjacent the gear 14 is a block 40, best seen in Figure 3 which moves across the teeth of the gear 12 and thereby separates the opposite sides thereof when the gear 14 is out of mesh with the gear 12.

Figure 4:
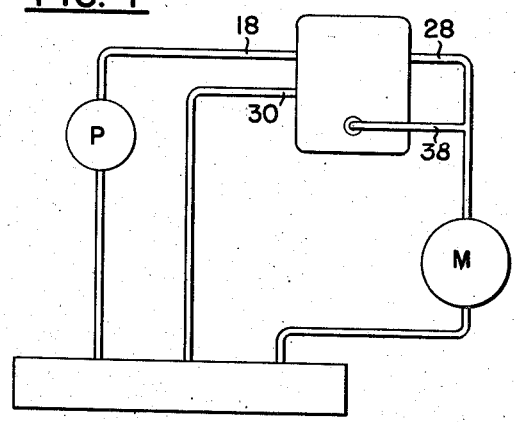
Figure 4 is a diagrammatic view showing a hydraulic operating circuit with a pressure convertor according to this invention being utilized.

In operation, the intensifier is connected in a hydraulic circuit as shown in Figure 4 with a pump delivering pressure fluid to the conduit 18. This fluid drives the gears of the pump as a gear motor and, since there is substantially no resistance to rotation of the gears, there is little power lost. Similarly, since the gear 14 is substantially out of mesh with the gear 12, there is substantially no fluid pumped out through the conduit 30, thus substantially the entire discharge of the pump passes through the intensifier and out through the conduit 28 to the hydraulic circuit to be supplied which may include a motor or other driven members.

When the driven member encounters resistance and pressure rises at the inlet thereof, pressure fluid will be conducted from the said inlet through the pilot line 38 to the pilot piston 36. When this pressure exceeds the thrust of the spring 32 the gear 14 will commence to move leftwardly as viewed in Figure 2. As the degree of mesh of the gear 14 with the gear 12 increases, there will be an increasing amount of fluid pumped out through the conduit 30 to exhaust. This represents a reduction in the amount of fluid discharged through the conduit 28 but at the same time the energy in the fluid being by-passed to exhaust is employed for exerting a torque on the gears in the pump which intensifies the pressure of the fluid being discharged to the conduit 28. The end result, when the gear 14 is completely in mesh with the gear 12, is to divert one-half of the fluid entering from the conduit 18 to exhaust and to discharge the other half of the fluid through the conduit 28 at increased pressure. It will be seen that the pressure rise during the operation of the intensifier is smooth and without breaks. Also, no valves need be employed for effecting the shift over from low to high pressure operation.

The shifting of the gear 14 may be accomplished in any of the several manners and is not necessarily directly responsive to pressure at the motor inlet.

It is also evident that this invention is not limited to a three gear arrangement but may be employed as well with a four gear pump if so desired. Further, while the pumping gears are shown as the usual type, it would be preferable to employ fully balanced gears in order to increase the available pressure range and to reduce wear on the running parts of the intensifier.

In Figure 5 there is illustrated a circuit in which the convertor of this invention is employed as a volume booster. The pump delivers to the inlet side of one set of pumping gears while the inlet side of the other set of pumping gears is connected with the reservoir. The discharge sides of the sets of pumping gears are connected together for parallel delivery to the supplied circuit. In order to utilize the variable volume and pressure characteristics of the device, the shiftable gear is shifted into full engagement with its mating pumping gear, then, as the pressure rises in the supplied circuit, the movable gear is shifted toward a position of lesser engagement with its mating gear. This reduces the volume which is being supplied by that set of gears to the supplied circuit and therefore the pressure in the supplied circuit will rise. This is due to the fact that the fluid from the pump passes through the upper set of pumping gears under less restriction and therefore loses less pressure in its passage.

It will be apparent that the arrangement shown in Figure 5 provides for initial delivery to the load of substantially twice the pump capacity and has substantially one-half the pump pressure. As the pressure on the load increases, the delivery from the convertor gradually reduces to that delivered by the pump while the pressure raises to substantially that delivered by the pump.

It will also be apparent that by separating the pumping units and connecting the gears thereof by shafts, the exact ratios of pressure and volume conversion can be varied at will.

It will be understood that this invention is susceptible to modification in order to adapt it to different usages and conditions and, accordingly, it is desired to comprehend such modifications within this invention as may fall within the scope of the appended claims.

I claim:

1. In a hydraulic circuit; a pump; a casing having an inlet port connected with said pump, an outlet port adapted for being connected with a load and an exhaust port; means in said casing normally conveying all of the fluid received at said inlet port to said outlet port; means responsive to a predetermined pressure at said outlet port for conveying a portion of the fluid received at said inlet port said exhaust port; and means operated by the said portion of said fluid during its passage from said inlet port to said exhaust port for compressing the remainder of the said fluid to a higher pressure.

2. In a hydraulic system; a fluid operable pump having input and output stations and a rotatable element; a fluid operable motor also having input and output stations and a rotatable element; means drivingly connecting said rotatable elements together; means of supplying pressure fluid to the input stations of said pump and motor; resilient means continuously urging said motor toward a decreased displacement position; fluid pressure responsive means associated with said motor and operable by fluid pressure to move said motor toward an increased displacement position; and means hydraulically connecting said fluid pressure responsive means with the output station of said pump.

3. The combination with a fluid displacement pump, of means for modifying the pressure and volumetric output of said pump comprising a casing having an inlet port connected to directly receive the output of said pump, an outlet port, and an exhaust port; means in said casing operated solely by the output of said pump for normally passing the entire output of said pump from the inlet port of said casing to the outlet port thereof; and means in said casing responsive to the pressure of fluid passing from the outlet port of said casing for modifying the operation of said last-named means to cause a portion of the output of said pump to be diverted through the exhaust port of said casing.

4. The combination with a fluid displacement pump, of means for modifying the normal pressure and volumetric output of said pump comprising a casing having an inlet port connected to directly receive the entire output of said pump, an outlet port, and an exhaust port connected with a source of fluid; means in said casing operated solely by the output of said pump for normally directing such output from the inlet to the outlet ports of said casing in a substantially unmodified condition; and other means in said casing connected with the outlet port thereof and responsive to a predetermined pressure rise at said outlet port for directing a portion of the output of said pump to the exhaust port of said casing and for increasing the pressure of the remaining portion of the output of said pump directed to the outlet port of said casing.

5. The combination with a fluid displacement pump, of means for modifying the normal pressure and volume of fluid displaced by said pump comprising a casing having an inlet port connected to receive the entire output of fluid displaced by said pump, an outlet port to be connected with a load, and an exhaust port connected with a source of fluid; means in said casing for normally conveying the entire output of fluid displaced by said pump from the inlet port to the outlet port of said casing; and other means in said casing responsive to increases in pressure of fluid at the outlet port of said casing above a predetermined pressure for conveying a portion of fluid received at the inlet port to the exhaust port of said casing and for utilizing the pressure energy of said last-named portion of fluid to increase the pressure of the remaining portion of fluid conveyed to the outlet port of said casing.

6. The combination with a fluid pressure source having an output station, of means for modifying the pressure and volumetric output of said source comprising a casing having an inlet port connected to receive the output of said source, an outlet port, and an exhaust port; means in said casing operated solely by the pressure of fluids introduced to the inlet port of said casing for normally passing the entire amount of such fluids from said inlet port to the outlet port of said casing; and fluid pressure-responsive means in said casing movable in response to the pressure of fluid passing from the outlet port of said casing for modifying the operation of said last-named means to cause a portion of fluids introduced to the inlet port of said casing to be diverted through the exhaust port of said casing.

MELVIN ALLEN CROSBY.

REFERENCES CITED

The following references are of record in the file of this patent:

UNITED STATES PATENTS

| Number | Name | Date |
|---|---|---|
| 1,656,093 | Baker | Jan. 10, 1928 |
| 1,879,219 | Harbison | Sept. 27, 1932 |
| 2,079,375 | McCollum | May 4, 1937 |
| 2,114,443 | Foisy | Apr. 19, 1938 |
| 2,149,326 | Wilkin | Mar. 7, 1939 |
| 2,157,284 | Egersdorfer | May 9, 1939 |
| 2,256,743 | Kleckner | Sept. 23, 1941 |
| 2,293,126 | Fersing | Aug. 18, 1942 |
| 2,382,701 | Egersdorfer | Aug. 14, 1945 |